(12) United States Patent
Li et al.

(10) Patent No.: US 11,657,274 B2
(45) Date of Patent: May 23, 2023

(54) WEAKLY-SUPERVISED SEMANTIC SEGMENTATION WITH SELF-GUIDANCE

(71) Applicant: Siemens Aktiengesellschaft, Munich (DE)

(72) Inventors: Kunpeng Li, Somerville, MA (US); Ziyan Wu, Princeton, NJ (US); Kuan-Chuan Peng, Plainsboro, NJ (US); Jan Ernst, Princeton, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 458 days.

(21) Appl. No.: 16/760,096

(22) PCT Filed: Oct. 9, 2018

(86) PCT No.: PCT/US2018/054993
§ 371 (c)(1),
(2) Date: Apr. 29, 2020

(87) PCT Pub. No.: WO2019/089192
PCT Pub. Date: May 9, 2019

(65) Prior Publication Data
US 2020/0356854 A1   Nov. 12, 2020

Related U.S. Application Data

(60) Provisional application No. 62/581,321, filed on Nov. 3, 2017.

(51) Int. Cl.
*G06N 3/08* (2023.01)
*G06N 5/04* (2023.01)

(52) U.S. Cl.
CPC .............. *G06N 3/08* (2013.01); *G06N 5/04* (2013.01)

(58) Field of Classification Search
CPC ..................................... G06N 3/08; G06N 5/04
See application file for complete search history.

(56) References Cited

U.S. PATENT DOCUMENTS

| 10,262,236 B2 * | 4/2019 | Lim | ........................ G06V 10/82 |
| 2019/0130213 A1 * | 5/2019 | Shazeer | ............... G06K 9/6255 |

OTHER PUBLICATIONS

International Search Report dated Jan. 21, 2019; International Application No. PCT/US2018/054993; 14 pages.
A. Chaudhry et al: "Discovering class-specific pixels for weakly-supervised semantic segmentation", arXiv: 1707.05821v1 [cs.CV], Jul. 18, 2017 (Jul. 18, 2017), XP055541094 / Jul. 18, 2017.

(Continued)

*Primary Examiner* — Reginald A Renwick (57) ABSTRACT

Systems, methods, and computer-readable media are described for performing weakly supervised semantic segmentation of input images that utilizes self-guidance on attention maps during training to cause a guided attention inference network (GAIN) to focus attention on an object in an input image in a holistic manner rather than only on the most discriminative parts of the image. The self-guidance is provided jointly by a classification loss function and an attention mining loss function. Extra supervision can also be provided by using a select number pixel-level labeled input images to enhance the semantic segmentation capabilities of the GAIN.

20 Claims, 6 Drawing Sheets

(56) References Cited

OTHER PUBLICATIONS

Y. Wei et al: "Object region mining with adversarial erasing: a simple classification to semantic segmentation approach", Proceedings of the 2017 IEEE Computer Society Conference on Computer Vision and Pattern Recognition (CVPR'17), Jul. 21, 2017 (Jul. 21, 2017), pp. 6488-6496, XP033250013 / Jul. 21, 2017.

D. Kim et al: "Two-phase learning for weakly supervised object localization", Proceedings of the 2017 IEEE International Conference on Computer Vision (ICCV'17), Oct. 22, 2017 (Oct. 22, 2017), pp. 3554-3563, XP033283225 / Oct. 22, 2017.

Kolesnikov Alexander et al: "Seed, expand and constrain: Three principles for weakly-supervised image segmentation", ECCV / Sep. 17, 2016.

* cited by examiner

WEAKLY-SUPERVISED SEMANTIC SEGMENTATION WITH SELF-GUIDANCE

CROSS-REFERENCE TO RELATED APPLICATION(S)

This application is a national phase filing under 35 U.S.C. § 371 of International Patent Application No. PCT/US2018/054993, filed Oct. 9, 2018, which claims the benefit of priority to U.S. Provisional Patent Application Ser. No. 62/581,321, filed on Nov. 3, 2017, the entire content of which are incorporated by reference.

BACKGROUND

The present invention relates generally to semantic segmentation, and more specifically, to weakly-supervised and partially-supervised semantic segmentation of images.

Weakly-supervised learning has recently gained more attention as an approach for addressing data scarcity in computer vision problems. Using only image-level labels, for example, attention maps can be obtained for a given input via backpropagation on a convolutional neural network (CNN). These attention maps relate to the CNN's response given specific patterns and tasks for which it was trained. The value of each pixel on an attention map indicates the extent to which a corresponding pixel of the input image contributes to the final output of the CNN. As such, segmentation information can be extracted from attention maps. However, conventional approaches for utilizing attention maps to extract segmentation information suffer from a number of drawbacks, technical solutions to which are described herein.

SUMMARY

In one or more example embodiments, a computer-implemented method is disclosed. The method includes providing an input image to a convolutional neural network (CNN), where the input image is associated with an image-level label, and obtaining, from the CNN, a first classification probability distribution associated with the input image. The method further includes determining a classification loss based at least in part on the first classification probability distribution and the image-level label of the input image, and determining an attention map associated with the input image. The method additionally includes applying a thresholding operation to the attention map to obtain a soft mask, applying the soft mask to the input image to obtain a masked image, and providing the masked image as an input to the CNN. The method further includes obtaining, from the CNN, a second classification probability distribution associated with the masked image and determining an attention mining loss associated with the attention map based at least in part on the first classification probability distribution and the second classification probability distribution. The method finally includes utilizing the classification loss and the attention mining loss to self-guide training of the CNN.

In one or more other example embodiments, a system is disclosed. The system includes at least one memory storing computer-executable instructions and at least one processor configured to access the at least one memory and execute the computer-executable instructions to perform a set of operations. The operations include providing an input image to a convolutional neural network (CNN), where the input image is associated with an image-level label, and obtaining, from the CNN, a first classification probability distribution associated with the input image. The operations further include determining a classification loss based at least in part on the first classification probability distribution and the image-level label of the input image, and determining an attention map associated with the input image. The operations additionally include applying a thresholding operation to the attention map to obtain a soft mask, applying the soft mask to the input image to obtain a masked image, and providing the masked image as an input to the CNN. The operations further include obtaining, from the CNN, a second classification probability distribution associated with the masked image and determining an attention mining loss associated with the attention map based at least in part on the first classification probability distribution and the second classification probability distribution. The operations finally include utilizing the classification loss and the attention mining loss to self-guide training of the CNN.

In one or more other example embodiments, a computer program product is disclosed. The computer program product includes a non-transitory storage medium readable by a processing circuit, the storage medium storing instructions executable by the processing circuit to cause a method to be performed. The method includes providing an input image to a convolutional neural network (CNN), where the input image is associated with an image-level label, and obtaining, from the CNN, a first classification probability distribution associated with the input image. The method further includes determining a classification loss based at least in part on the first classification probability distribution and the image-level label of the input image, and determining an attention map associated with the input image. The method additionally includes applying a thresholding operation to the attention map to obtain a soft mask, applying the soft mask to the input image to obtain a masked image, and providing the masked image as an input to the CNN. The method further includes obtaining, from the CNN, a second classification probability distribution associated with the masked image and determining an attention mining loss associated with the attention map based at least in part on the first classification probability distribution and the second classification probability distribution. The method finally includes utilizing the classification loss and the attention mining loss to self-guide training of the CNN.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Example embodiments of the invention relate to, among other things, systems, methods, computer-readable media, techniques, and methodologies for performing weakly-supervised semantic segmentation of input images, or more specifically, for using supervision on attention maps during training of a convolutional neural network (CNN) while learning a weakly-labeled task. In particular, example embodiments include the use of self-guidance during training that causes the CNN to focus attention on an object in an input image in a holistic manner rather than only on the most discriminative parts of the image. Moreover, example embodiments also relate to the use of extra supervision (e.g., partial supervision) using a select number of pixel-level labeled input images to enhance the semantic segmentation capabilities of the weakly-supervised CNN. A CNN structured and trained in accordance with example embodiments of the invention is referred to at times herein as a guided inference attention network (GAIN).

Conventional approaches for generating and using attention maps during CNN training involve supervision using only a classification loss of the CNN. Attention maps that are supervised using only the classification loss, however, cover only small and the most discriminative regions of an object of interest. While such attention maps can serve as reasonably reliable priors for tasks such as segmentation, they fail to cover target foreground objects in an image in as complete a manner as a weakly-supervised GAIN in accordance with example embodiments. Thus, a weakly-supervised GAIN that is trained in accordance with example embodiments provides significant performance improvement over conventional approaches for training a CNN that involve only the use of the classification loss. Further, while some conventional approaches attempt to boost performance of the CNN by combining multiple attention maps via iterative erasing steps or consolidating attention maps from multiple CNNs, such approaches merely passively exploit trained network attention and do not provide the level of performance enhancement achieved by a GAIN trained in accordance with example embodiments, according to which, task-specific supervision is directly applied to attention maps during the training phase, either in a weakly-supervised or a partially-supervised manner.

In addition, in conventional object categorization tasks involving only image-level object class labels, a pathological bias may be encountered in the training data when a foreground object incidentally always correlates with the same background object. As a non-limiting example, training data that includes images of boats that are always present in water may result in a bias towards water as a distractor with high correlation. In this case, the training has no incentive to focus attention only on the foreground class and performance can suffer when testing data does not have the same correlation (e.g., boats out of water). While attempts have been made to remove this bias by re-balancing the training data, example embodiments instead model the attention map explicitly as part of the training, and thus, allow for controlling the attention explicitly through partial supervision that guides attention to the regions of interest. Further, as noted above, a GAIN trained in accordance with example embodiments achieves improved performance over conventional approaches as a result of the explicit self-guided attention model even if extra partial supervision is not employed.

A GAIN trained in accordance with example embodiments builds constraints on an attention map in a bootstrapped fashion. In particular, a GAIN in accordance with example embodiments includes two CNN streams that share parameters—a classification stream and an attention mining stream. The aim of the classification stream is to discover regions in an input image that assist with class recognition. The aim of the attention mining stream is to ensure that all regions in the input image that contribute to the classification decision are included in the network's attention. In accordance with example embodiments, online generation and training of attention maps using a classification loss function and an attention mining loss function jointly results in more complete attention maps that are more accurately tailored to the segmentation task than conventional attention map generation and training approaches.

Illustrative methods in accordance with example embodiments of the invention will now be described. It should be noted that any given operation of the method 200 or the method 300 may be performed by one or more of the program modules or the like depicted in FIG. 4, whose operation will be described in more detail later in this disclosure. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 1A:
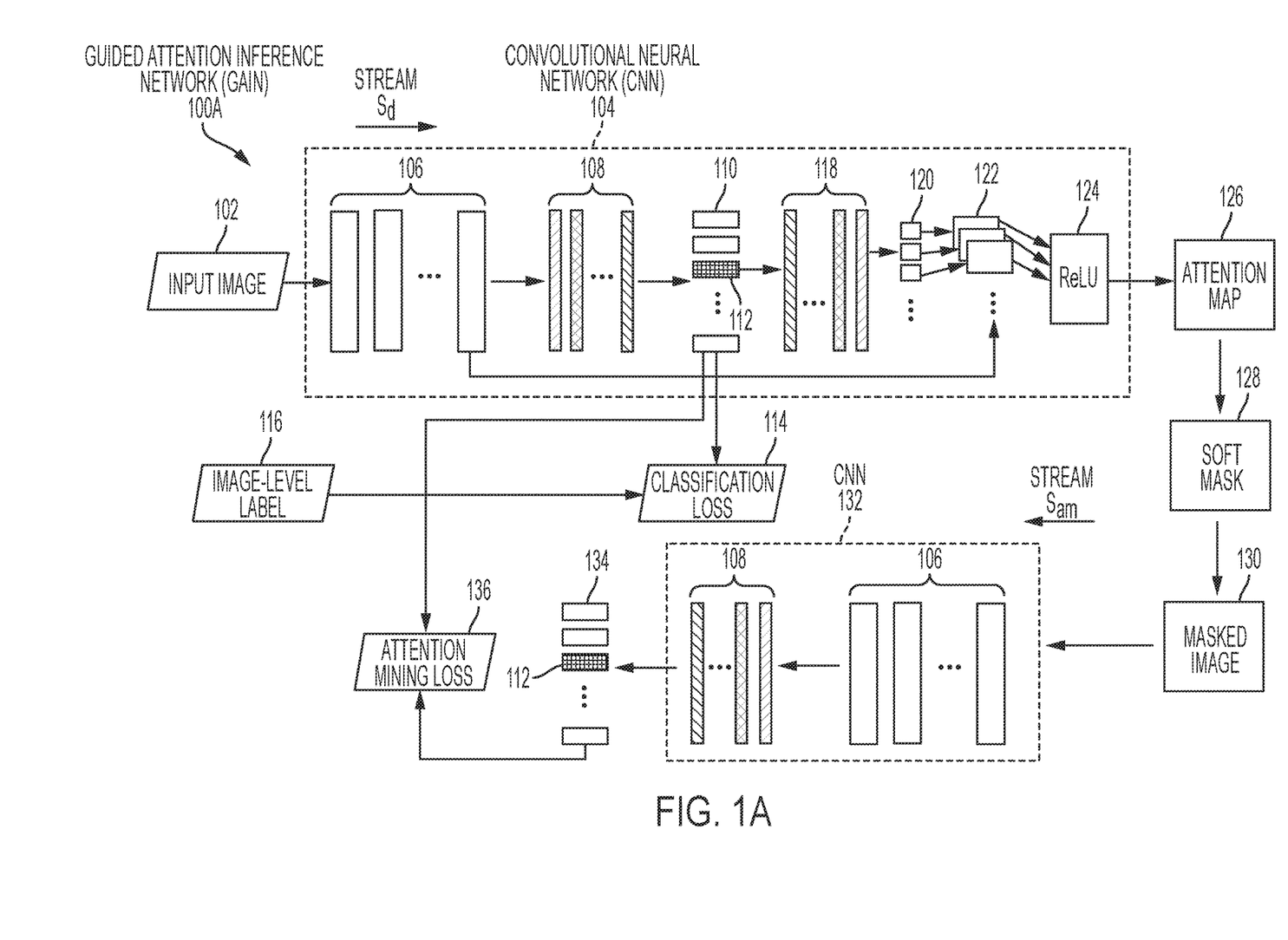
FIG. 1A is a schematic diagram of a weakly-supervised guided attention inference network (GAIN) in accordance with example embodiments.
Figure 2A:
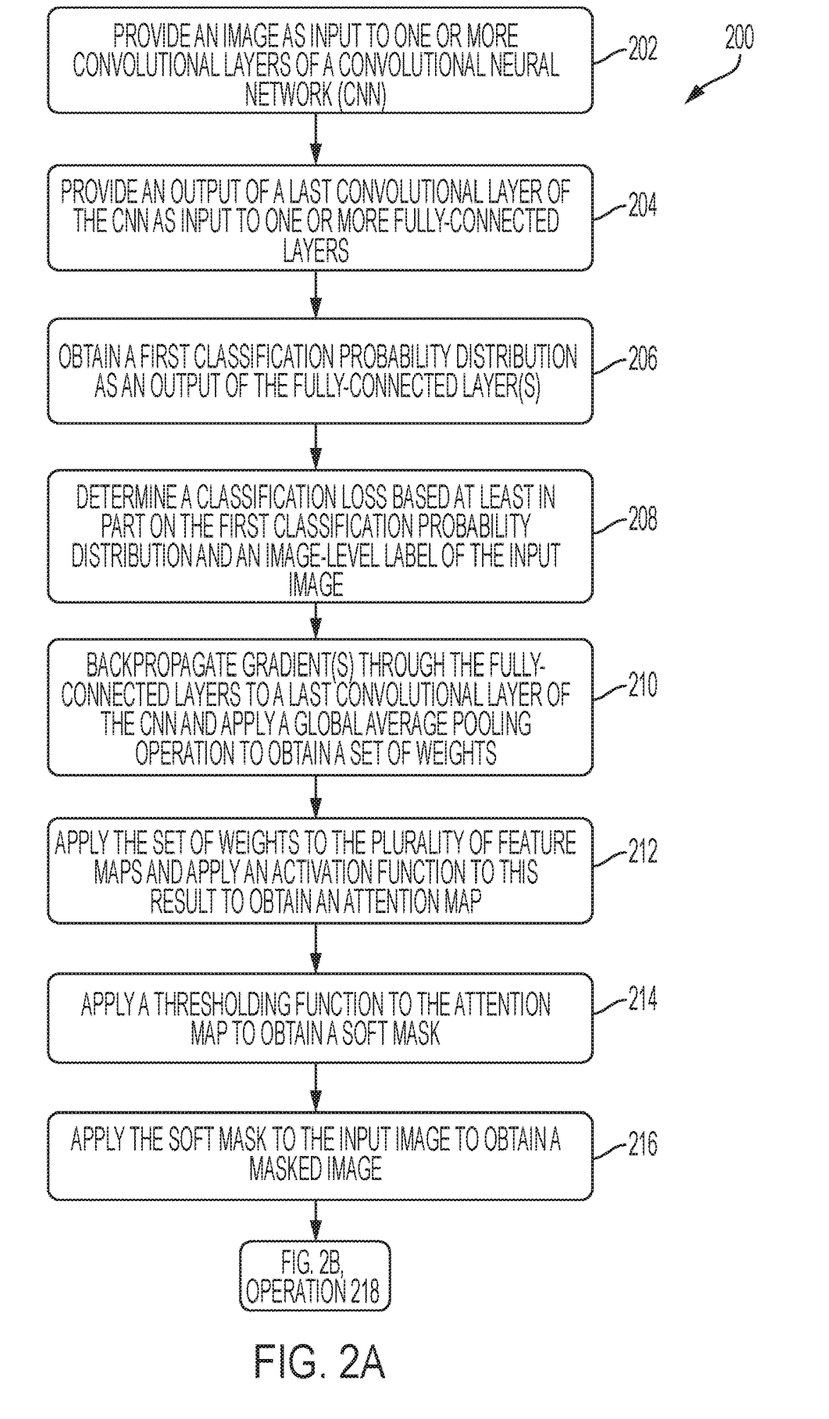
FIGS. 2A and 2B are process flow diagrams of an illustrative weakly-supervised method for training a GAIN in accordance with one or more example embodiments.
Figure 2B:
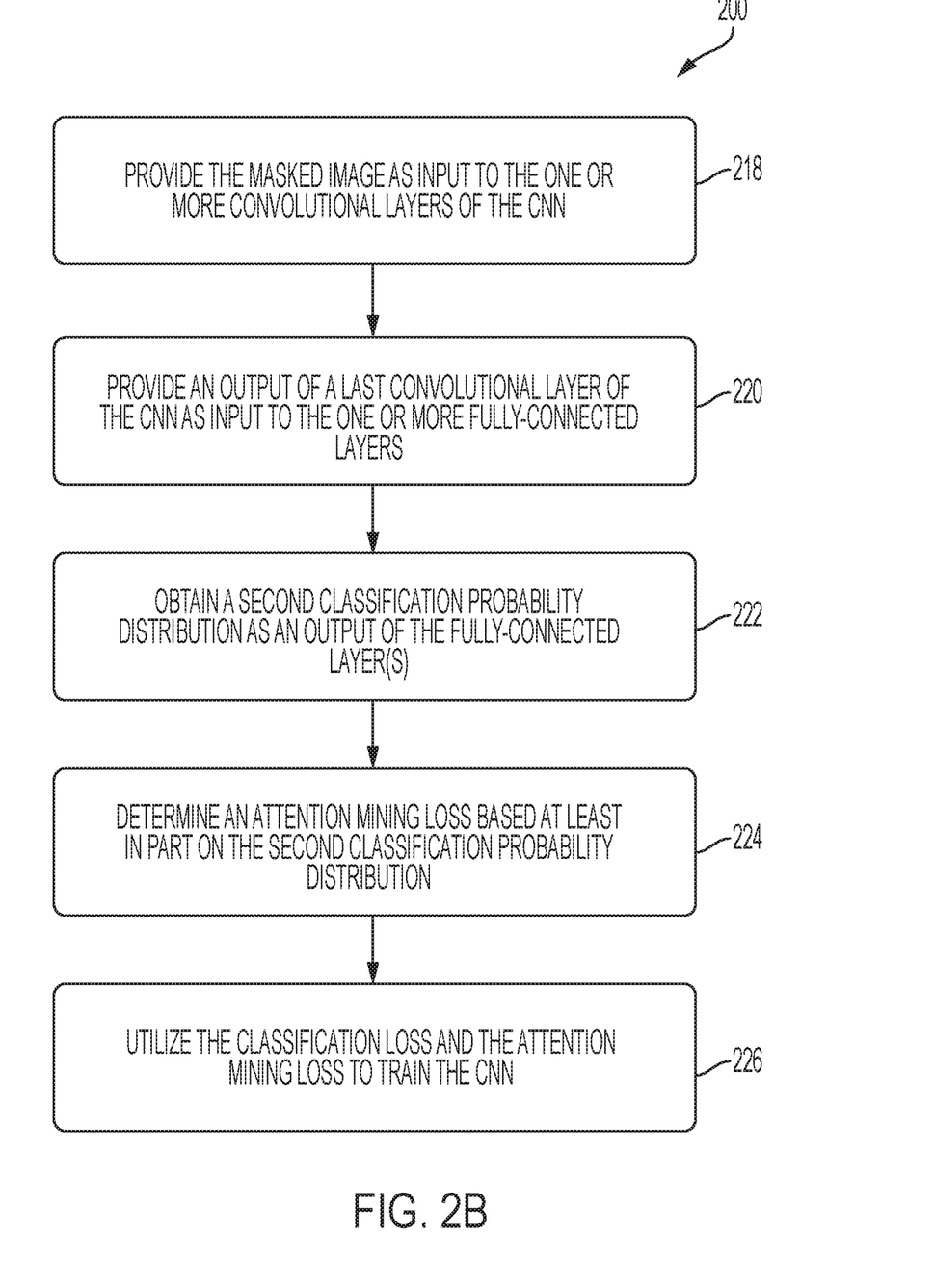

FIG. 1A is a schematic diagram of a weakly-supervised GAIN in accordance with example embodiments. FIGS. 2A and 2B are process flow diagrams of an illustrative weakly-supervised method for training a GAIN in accordance with one or more example embodiments. FIG. 1A and FIGS. 2A and 2B will be described in conjunction with one another hereinafter. In example embodiments, each operation of the method 200 may be performed, at least in part, by executing computer-executable instructions of the one or more weakly-supervised GAIN training modules 420 depicted in FIG. 4, for example.

At block 202 of the method 200, in example embodiments, an image 102 is provided as input to one or more convolutional layers 106 of a CNN 104 of a GAIN 100A. The image 102 is provided as input to the convolutional layer(s) 106 of the CNN 104 as part of a training phase of the GAIN 100A. It should be appreciated that although FIG. 1A and the method 200 of FIGS. 2A-2B depict and describe the training phase with respect to a single image 102, training the GAIN 100A would involve providing, across multiple iterations, training data to the GAIN 100A that includes multiple images having image-level labels.

At block 204 of the method 200, in example embodiments, an output of a last convolutional layer of the one or more convolutional layers 106 is provided as input to one or more fully-connected layers 108 of the CNN 104. Then, after the output of the last convolutional layer propagates through the fully-connected layer(s), a first classification probability distribution 110 is obtained at block 206 of the method 200. The first classification probability distribution 110 indicates a respective probability for each class with respect to the input image 102. More specifically, the first classification probability distribution 110 indicates a respective probability predicted by the CNN 104 for each class, where the respective probability corresponding to a given class indicates the predicted probability that an object of interest in the input image 102 falls within that class. The class having the largest predicted probability may be the predicted class 112 for the input image 102. In certain example embodiments, the input image 102 may have multiple class labels, in which case, there may be multiple predicted classes 112 for the input image 102.

At block 208 of the method 200, in example embodiments, a classification loss 114 is determined based at least in part on the first classification probability distribution 110 and an image-level label 116 of the input image 102. The classification loss 114 is indicative a deviation between the first classification probability distribution 110 and the ground-truth data. More specifically, the classification loss 114 indicates the extent (if any) to which the predicted classification of the input image 102 by the CNN 104—as reflected by the first classification probability distribution 110—deviates from the ground-truth classification of the input image 102—as indicated by the image-level label 116 of the input image 102.

At block 210 of the method 200, in example embodiments, backpropagation of gradient(s) is performed through the fully-connected layers 118 to a last convolutional layer of the convolutional layer(s) 106. In example embodiments, the fully-connected layers 118 may include the same layers as the fully-connected layers 108 but in reverse order. More specifically, in example embodiments, a gradient of each predicted class 112 of the input image 102 is backpropagated through the fully-connected layers 118 to a last convolutional layer of the convolutional layer(s) 106. A global average pooling operation is then applied to the backpropagated gradients to obtain a set of weights 120 which are later applied to a set of feature maps 122.

In example embodiments, each feature map in the set of feature maps 122 represents the response of a corresponding filter of the last convolutional layer to the input image 102. More specifically, each feature map is obtained as an output of a corresponding filter of a convolutional layer. In particular, each filter embodies a set of numerical operations that are applied to an input (which may itself be the output of a previous convolutional layer) to produce a feature map as an output. Each feature map may be a grayscale image having the same size as the output of the last convolutional layer, where each image represents a response of a corresponding filter of the last convolutional layer. In example embodiments, brighter areas in a grayscale feature map indicate portions of the input image 102 that trigger the corresponding filter more than portions of the input image 102 that correspond to darker areas of the feature map.

At block 212 of the method 200, in example embodiments, the set of weights 120 is applied to the set of feature maps 122 to obtain an attention map 126. More specifically, the set of weights 120 may be multiplied by the set of feature maps 122 and summed to produce a weighted sum to which an activation function such as a ReLU function 124 is applied to obtain the attention map 126. In particular, each feature map in the set of feature maps 122 is multiplied by a respective corresponding weight in the set of weights 120 as part of generating the attention map 126. In example embodiments, the attention map 126 is a grayscale image, where brighter areas of the attention map 126 indicate portions of the input image 102 that support the CNN's 104 predicted class 112 to a greater extent than portions of the input image 102 that correspond to darker areas of the attention map 126.

As previously noted, in example embodiments, the GAIN 100A includes two CNN streams that share parameters—a classification stream $S_{cl}$ and an attention mining stream $S_{am}$. The classification stream $S_{cl}$ seeks to determine those regions of input images that help to recognize classes, while the attention mining stream $S_{am}$ seeks to ensure that all regions of input images that contribute to the classification decision are included in the network's attention. According to an example mathematical formulation of the above-described operations, in stream $S_{cl}$, for a given image I, let $f_{l,k}$ be the activation of unit k in the l-th layer (e.g., the last convolutional layer of the CNN 104). For each class c from the ground-truth image-level label 116 of the input image 102 (e.g., the predicted class 112), the gradient of score $s^c$ corresponding to class c is computed with respect to the activation $f_{l,k}$. These gradients are backpropagated and passed through a global average pooling layer to obtain the neuron importance weights $w^c_{l,k}$ (e.g., collectively the set of weights 120) as defined by the following equation:

$$w^c l, k = GAP\left(\frac{\partial s^c}{\partial f_{l,k}}\right),$$

where GAP represents the global average pooling operation.

In example embodiments, the parameters of the CNN 104 are not updated after obtaining $w^c_{l,k}$ by backpropagation. Because $w^c_{l,k}$ represents the importance of $f_{l,k}$ supporting the prediction of class c, in example embodiments, the weights matrix $w^c$ (which is the collection of weights $w^c_{l,k}$ and corresponds to the set of weights 120) is used as the kernel and 2D convolution is applied over feature maps matrix $f_l$ (which is the collection of activations $f_{l,k}$ and corresponds to the set of feature maps 122) in order to integrate all the feature maps of the last convolutional layer. In example embodiments, this 2D convolution applied over the feature maps matrix $f_l$ using the weights matrix as a kernel $w^c$ corresponds to the operation(s) at block 212 of the method 200. In particular, the 2D convolution applied over the feature maps matrix $f_l$ using the weights matrix as a kernel $w^c$ corresponds, in example embodiments, to multiplication of each feature map in the set of feature maps 122 by a respective corresponding weight in the set of weights 120 and the summing of the results. An activation function such as a ReLU operation 124 is then applied to this summed result in example embodiments to obtain an attention map $A^c$ (e.g., the attention map 126).

At block 214 of the method 200, a thresholding function is applied to the attention map 126 to obtain a soft mask 128. The soft mask 128 corresponds to the attention map 126 having those regions with high attention values removed. More specifically, as previously noted, the attention map 126 may be a grayscale image in which brighter areas reflect higher attention values than darker areas of the image. In example embodiments, application of the thresholding function to the attention map 126 causes the brighter areas of the attention map 126 corresponding to attention values that exceed a threshold value to be cropped from the attention map 126 to yield the soft mask 128 containing only those regions of the attention map 126 corresponding to attention values below the threshold value. Then, at block 216 of the method 200, the soft mask 128 may be applied to the input image 102 to obtain a masked image 130. In example embodiments, application of the soft mask 128 to the input image 102 may involve element-wise multiplication of the input image 102 and the soft mask 128.

In example embodiments, a mathematical formulation for generating the masked image 130 from the soft mask 128 is as follows. Assume again that I is the input image 102 and that T is the thresholding function, then the masked image $I^{*c}$ is given by $I^{*c}=I-(T(A^c)\cdot I)=(ID-T(A^c))\cdot I$, where ID represents the identity matrix; $A^c$ represents the attention map 126; $ID-T(A^c))$ represents the soft mask 128; $I^{*c}$ represents the masked image 130; and "·" denotes element-wise multiplication. $I^{*c}$ represents regions of the input image 102 that are beyond the network's current attention for class c. In example embodiments, the thresholding function T is a Sigmoid function defined as $$T(A^c) = \frac{1}{1+\exp(-\omega(A^c-\sigma))},$$

where σ is a threshold matrix whose elements are all equal to σ and ω is a scale parameter ensuring that $T(A^c)_{i,j}$ approximately equals 1 when $A^c_{i,j}$ is larger than σ and approximately equals 0 when $A^c_{i,j}$ is not larger than 0. In this manner, regions of the attention map $A^c$ that have attention values $A^c_{i,j}$ larger than a are cropped from the attention map $A^c$ by the thresholding function T to yield the soft mask 128. The masked image $I^{*c}$ (e.g., the masked image 130) can then be obtained by the element-wise multiplication of the input image 102 and the soft mask 128.

Referring now to FIG. 2B in conjunction with FIG. 1A, at block 218 of the method 200, the masked image 130 is provided as input to a CNN 132 that shares parameters with (e.g., is the same as) the CNN 104 to which the input image 102 is originally provided as input. In particular, the CNN 132 includes the same convolutional layer(s) and fully-connected layer(s) having the same parameters as corresponding convolutional layer(s) 106 and fully-connected layer(s) 108 of the CNN 104. The masked image 130 is thus provided as input to the same convolutional layer(s) 106 in CNN 132 that form part of the CNN 104. The CNN stream through the CNN 104 is referred to herein as the classification stream $S_{cl}$ and the CNN stream through the CNN 132 is referred to herein as the attention mining stream $S_{am}$.

Then, at block 220 of the method 200, in example embodiments, an output of a last convolutional layer 106 of the attention mining stream $S_{am}$ is provided as input to the fully-connected layer(s) 108 to obtain a second classification probability distribution 134 as an output at block 222 of the method 200. Because the soft mask 128 was generated by removing those regions of the attention map 126 with higher attention values—which in turn correspond to regions of the input image 102 that most support the predicted class 112—the respective predicted probability associated with class 112 in the second classification probability distribution should be as small as possible and ideally zero.

At block 224 of the method 200, in example embodiments, an attention mining loss 136 is determined based at least in part on the second classification probability distribution 134. More specifically, in example embodiments, the first classification probability distribution 110 is compared to the second classification probability distribution 134 to determine the attention mining loss 136. If there is some amount of attention mining loss 136 (e.g., the predicted probability associated with the class 112 is non-zero in the second classification probability distribution 134), then the CNN 132 (which in example embodiments is the same as CNN 104) is penalized accordingly. That is, the gradient of the attention mining loss 136 is computed and backpropagated to update CNN shared parameters for a successive iterative of the training of the GAIN 100A.

In this manner, the classification loss 114 and the attention mining loss 136 are jointly utilized, at block 226 of the method 200, to self-guide the GAIN 100A during the training phase to minimize the classification loss 114 and the attention mining loss 136 over multiple iterations of the method 200. Thus, with the self-guidance provided by the classification loss 114 and the attention mining loss 136, the GAIN 100A learns to extend the focus area of the input image 102 contributing to recognition of a target class (e.g., class 112) as much as possible such that attention maps are tailored towards the task of interest (e.g., semantic segmentation).

Referring again the example mathematical formulation introduced earlier, the masked image $I^{*c}$ 130 is used as an input of the attention mining stream $S_{am}$. Because the goal is to guide the GAIN 100A to focus on all parts of the input image 102 corresponding to the class of interest, $I^{*c}$(e.g., the masked image 130) is enforced to contain as few features as possible belonging to the target class c. In other words, regions of the attention map $A^c$ (e.g., the attention map 126) beyond the high-responding areas (e.g., areas with attention values exceeding a threshold value) should ideally not include any pixels that can trigger the GAIN 100A to recognize the object in the input image 102 as belonging to class c. From a loss function perspective, this can be viewed as minimization of the predicted score of $I^{*c}$ for class c. In example embodiments, the attention mining loss function $L_{am}$ is defined as follows:

$$L_{am} = \frac{1}{n}\sum_c s^c(I^{*c}),$$

where $s^c(I^{*c})$ denotes the prediction score of $I^{*c}$ for class c and n is the number of ground-truth class labels for the input image 102. The total self-guidance loss $L_{self}$ then becomes $L_{self}=L_{cl}+\alpha L_{am}$. In example embodiments, $L_{cl}$ supports multi-label and multi-class classification and a multi-label soft margin loss is an example implementation of $L_{cl}$. In should be appreciated, however, that alternative loss functions can be used for specific tasks. The parameter α is a weighting parameter that can take on any suitable value. In example embodiments, α=1.

Figure 1B:
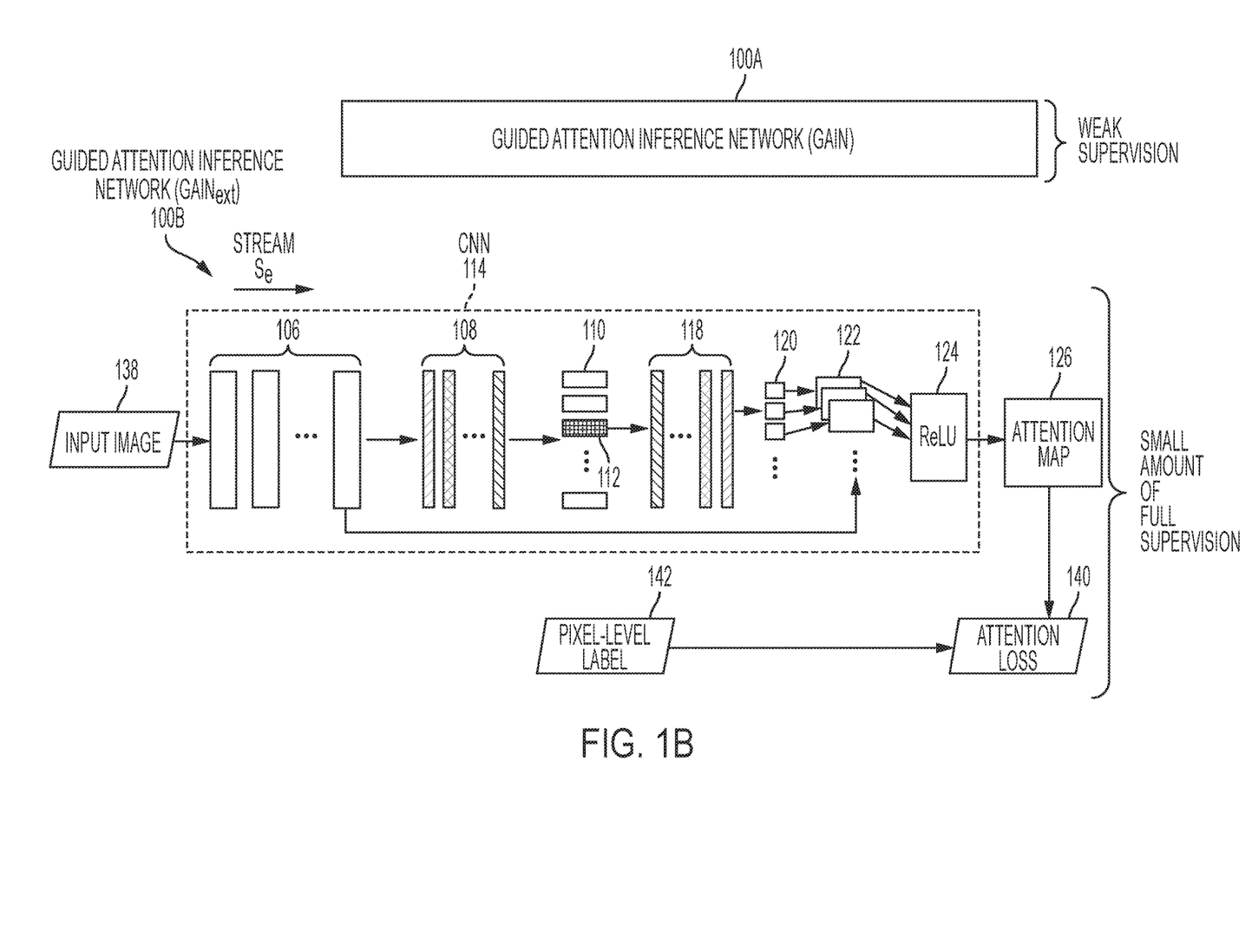
FIG. 1B is a schematic diagram of a partially-supervised GAIN that includes the use of extra supervision in accordance with example embodiments.
Figure 3:
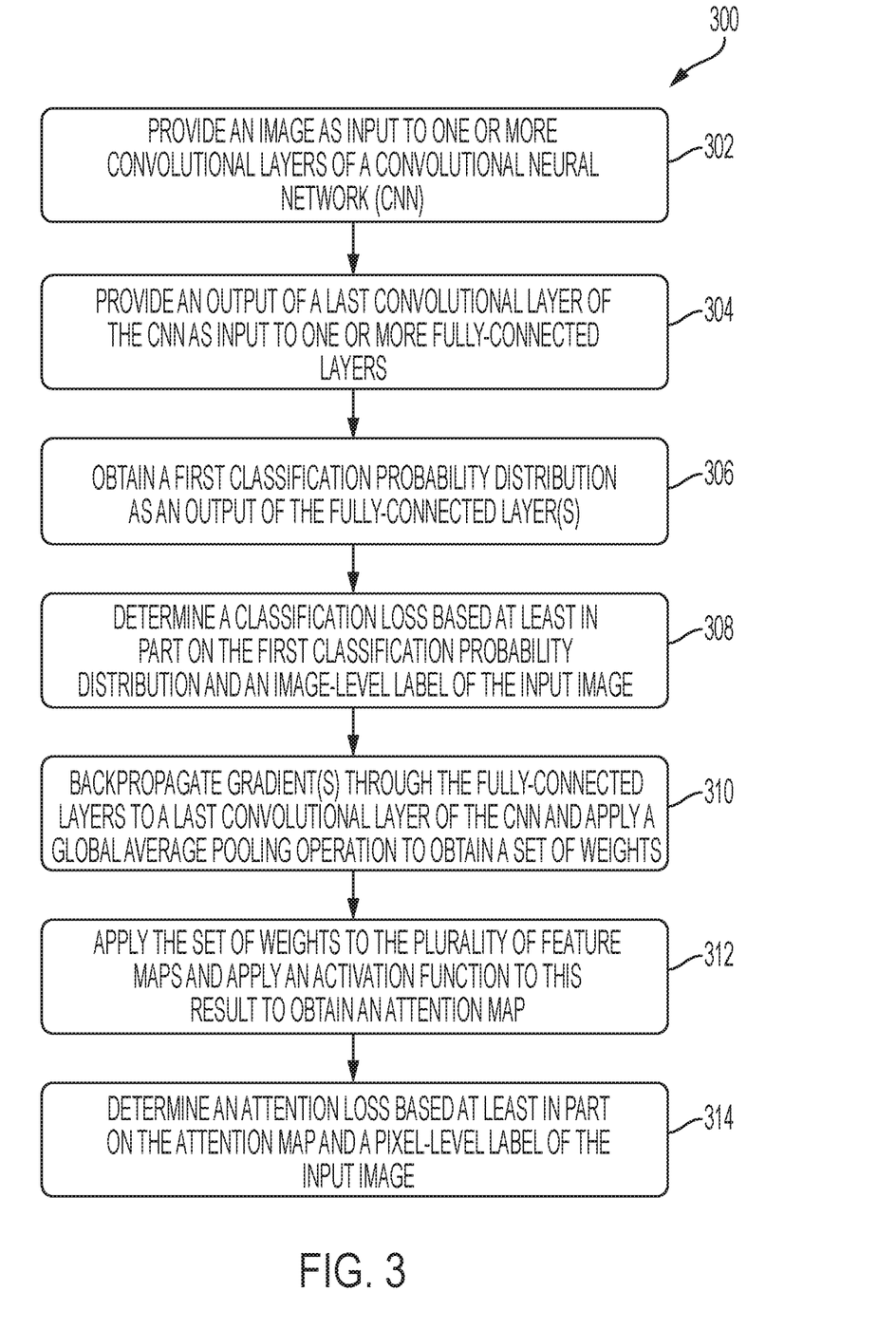
FIG. 3 is a process flow diagram of an illustrative partially-supervised method for training a GAIN that includes the use of extra supervision in accordance with example embodiments.

The above-described example embodiments involve utilizing the classification loss 114 and the attention mining loss 136 jointly to self-guide the GAIN 100A based on the attention map 126 itself. In other example embodiments, the network can be directed to focus on particular parts of the input image 102 by using a small amount of full supervision (referred to herein as partial supervision) to control the attention map 126 learning process. FIG. 1B is a schematic diagram of a partially-supervised GAIN (GAIN$_{ext}$ 100B) that integrates a small amount of full supervision into the weakly-supervised learning framework of the GAIN 100A. FIG. 3 is a process flow diagram of an illustrative partially-supervised method for training the GAIN$_{ext}$ 100B in accordance with example embodiments. FIGS. 1B and 3 will be described in conjunction with one another hereinafter. In example embodiments, each operation of the method 300 may be performed, at least in part, by executing computer-executable instructions of the one or more partially-supervised GAIN training modules 422 depicted in FIG. 4, for example.

Referring now to FIG. 3, operations at blocks 302, 304, 306, 308, 310, and 312 of the method 300 correspond to operations 202, 204, 206, 208, 210, and 212 of the method 200, respectively. That is, in example embodiments, the trainable attention map 126 is generated in the partially-supervised GAIN$_{ext}$ 100B in the same fashion as it is in the weakly-supervised self-guided GAIN 100A except that the input image 138 depicted in FIG. 1B to the partially-supervised GAIN$_{ext}$ 100B is an input image 138 associated with a pixel-level label 142. In these example embodiments, the attention map 126 is generated by feeding the input image 138 associated with the pixel-level label 142 into a CNN 144 that shares parameters with the CNN 104.

However, in contrast to the method 200, at block 314 of the method 300, in example embodiments, an attention loss 140 is determined based at least in part on the attention map 126 and the pixel-level label 142. In example embodiments, the attention loss 140 may be determined by calculating an L2 Euclidean norm between the pixel-level label 142 and the attention map 126. In example embodiments, the small amount of full supervision is provided by the pixel-level label 142 with respect to training of GAIN$_{ext}$ 100B. In particular, in example embodiments, the partially-supervised GAIN$_{ext}$ 100B may be trained using a dataset that includes input images with only image-level labels as well as a select number of input images having pixel-level labels, where such training occurs in conjunction with the training of the weakly-supervised GAIN 100A on input images having only image-level labels.

In example embodiments, after the training phase is complete, the trained GAIN 100A and/or the trained GAIN$_{ext}$ 100B can be used in connection with a testing phase. During the testing phase, an input image without labels can be provided as input to the trained GAIN, and the trained GAIN is expected to reach higher classification accuracy and produce attention maps which cover more complete areas corresponding to the predicted class, as compared with the classification accuracy and the attention maps generated by conventional CNNs.

Referring again to the mathematical formulation introduced earlier, in addition to the classification loss 114 and the attention mining loss 136 of the self-guided GAIN 100A, another loss function $L_e$ may be defined for the external supervision provided to the GAIN$_{ext}$ 100B. In particular, in example embodiments, $L_e$ is defined as follows:

$$L_e = \frac{1}{n} \sum_c (A^c - H^c)^2,$$

where $H^c$ denotes the extra external supervision provided to the partially-supervised GAIN$_{ext}$ 100B. In example embodiments, the extra supervision $H^c$ is provided by the pixel-level labels of certain input images.

Generating pixel-level segmentation maps is time-consuming, and as such, only a small amount of data with extra supervision may be used to enhance the weakly-supervised GAIN framework. In example embodiments, an external CNN stream $S_e$ may be provided in addition to the classification stream $S_{cl}$ and the attention mining stream $S_{am}$ such that all three streams share the same parameters. In example embodiments, the classification stream $S_{cl}$ requires input images with image-level labels and the stream $S_e$ requires input images with pixel-level labels. More generally, however, in example embodiments, the input images to the classification stream $S_{cl}$ include both images with only image-level labels as well as images with both image-level labels and pixel-level labels, and the input images to the stream $S_e$ include images with only pixel-level labels as well as images with both pixel-level labels and image-level labels. Thus, input to the stream $S_e$ of GAIN$_{ext}$ 100B includes all input images with only pixel-level labels, whereas input to the classification stream $S_{cl}$ of GAIN$_{ext}$ 100B (e.g., the classification stream $S_{cl}$ of GAIN 100A which is integrated into GAIN$_{ext}$) includes all images in the training set with only image-level labels.

In example embodiments, a loss function $L_{ext}$ can then be defined for the GAIN$_{ext}$ 100B as follows: $L_{ext} = L_{self} + \omega L_e = L_{cl} + \alpha L_{am} + \omega L_e$, where $\omega$ is a weighting parameter that determines the amount of emphasis that is placed on the extra supervision. In example embodiments, the GAIN$_{ext}$ 100B can be modified to fit various tasks. For instance, once activations $f_{l,k}$ corresponding to the network's final output are obtained, $L_e$ can be used to guide the GAIN$_{ext}$ 100B to focus on areas that are critical to the task of interest. As a non-limiting example, $L_e$ can be used to guide the GAIN$_{ext}$ 100B to learn features that are robust to dataset bias.

Both the GAIN 100A and the GAIN$_{ext}$ 100B in accordance with example embodiments provide improved performance (e.g., improved classification accuracy) over conventionally trained CNNs. However, GAIN$_{ext}$ 100B can provide even greater performance compared to GAIN 100A by reducing the negative impact of potential bias in training data. For instance, assume that we have a training dataset that includes two categories of images: images of boats without sea or water surrounding the boats (i.e., boats out of water) and images of sea or water without boats. Utilizing this dataset to train the GAIN 100A with only the self-guidance provided by image-level supervision provides an improvement in classification accuracy over conventional CNNs. In particular, the trained GAIN 100A is taught to capture all relevant parts of the target object, in this case, both the boat itself and the water surrounding it in the image. Thus, when an image contains water but no boat, the GAIN 100A is more likely to generate a negative prediction than conventional CNNs.

However, in example embodiments, even with self-guidance, the GAIN 100A may be unable to fully decouple the boat from the water due to the bias in the training dataset. In such example embodiments, training the GAIN$_{ext}$ 100B with a small number of images having pixel-level labels yields improved performance over conventional CNNs with respect to both categories of images in the training dataset (i.e., boats in water and water without boats). In particular, the pixel-level labels are able to precisely teach the GAIN$_{ext}$ 100B what the relevant features, components, or parts of the target objects are, and as a result, the boats in the input images can be decoupled from the water. Thus, the extra guidance provided to the $GAIN_{ext}$ 100B on the attention maps mitigates the negative impact of bias in the training dataset.

Example embodiments described herein provide a number of technical effects and technical benefits over existing solutions. In particular, example embodiments define a new data structure, specifically a new type of CNN referred to herein as a guided attention inference network (GAIN), that defines an additional loss function—an attention mining loss—that is used jointly with a classification loss function to provide self-guidance based on the attention map during training of the GAIN. The self-guidance provided by the classification loss and the attention mining loss together yields the technical effect of producing a trained GAIN that provides improved performance (e.g., improved classification accuracy) over conventional CNNs. This technical effect of improved classification accuracy is obtained by causing the GAIN to focus on portions of an input image beyond only the most discriminative portions, which in turn, produces attention maps that capture more portions of an input image that trigger classification into a particular class than attention maps produced by conventional CNNs. In addition, example embodiments that provide extra supervision to a GAIN using, for example, a select number of pixel-level labeled input images yield the additional technical effect of mitigating the negative impact of potential bias in the training dataset. Thus, a trained GAIN in accordance with example embodiments constitutes an improvement to neural network computer-based technology.

One or more illustrative embodiments of the disclosure are described herein. Such embodiments are merely illustrative of the scope of this disclosure1 and are not intended to be limiting in any way. Accordingly, variations, modifications, and equivalents of embodiments disclosed herein are also within the scope of this disclosure. For example, the data key generation process described herein in accordance with example embodiments can be expanded to use multiple data seeds to produce one set of unique and reproducible data for each data seed.

Figure 4:
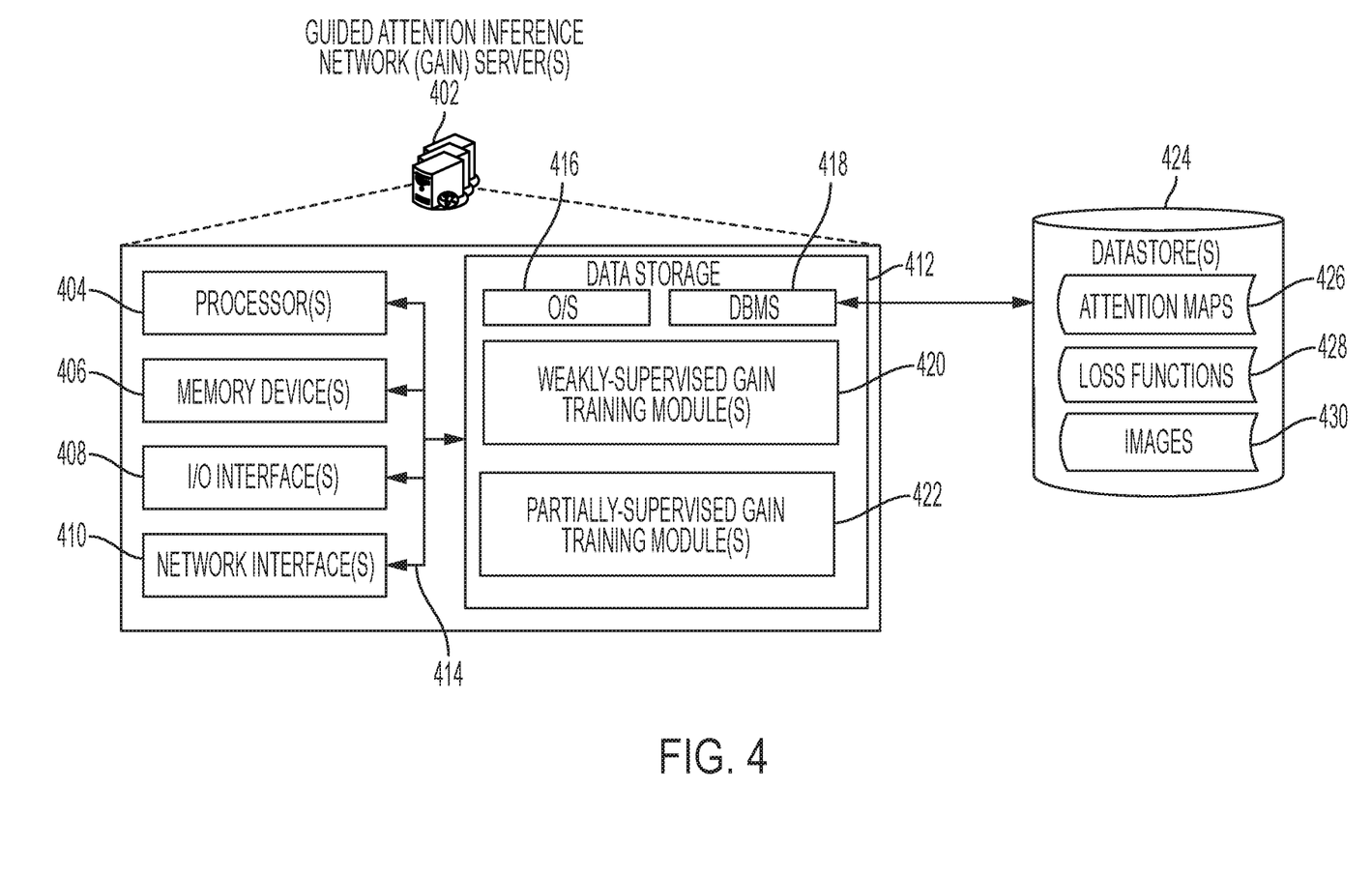
FIG. 4 is a schematic diagram of an illustrative computing configuration for implementing one or more example embodiments.

FIG. 4 is a schematic diagram of an illustrative computing configuration for implementing one or more example embodiments of the invention. In particular, FIG. 4 depicts one or more GAIN servers 402 configured to implement one or more example embodiments. While the GAIN server(s) 402 may be described herein in the singular, it should be appreciated that multiple servers 402 may be provided, and functionality described herein may be distributed across multiple such servers 402.

In an illustrative configuration, the GAIN server 402 may include one or more processors (processor(s)) 404, one or more memory devices 406 (generically referred to herein as memory 406), one or more input/output ("I/O") interface(s) 408, one or more network interfaces 410, and data storage 414. The GAIN server 402 may further include one or more buses 412 that functionally couple various components of the GAIN server 402.

The bus(es) 412 may include at least one of a system bus, a memory bus, an address bus, or a message bus, and may permit the exchange of information (e.g., data (including computer-executable code), signaling, etc.) between various components of the GAIN server 402. The bus(es) 412 may include, without limitation, a memory bus or a memory controller, a peripheral bus, an accelerated graphics port, and so forth. The bus(es) 412 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 406 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 406 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 406 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 414 may include removable storage and/or non-removable storage including, but not limited to, magnetic storage, optical disk storage, and/or tape storage. The data storage 414 may provide non-volatile storage of computer-executable instructions and other data. The memory 406 and the data storage 414, removable and/or non-removable, are examples of computer-readable storage media (CRSM) as that term is used herein.

The data storage 414 may store computer-executable code, instructions, or the like that may be loadable into the memory 406 and executable by the processor(s) 404 to cause the processor(s) 404 to perform or initiate various operations. The data storage 414 may additionally store data that may be copied to memory 406 for use by the processor(s) 404 during the execution of the computer-executable instructions. Moreover, output data generated as a result of execution of the computer-executable instructions by the processor(s) 404 may be stored initially in memory 406 and may ultimately be copied to data storage 414 for non-volatile storage.

More specifically, the data storage 414 may store one or more operating systems (O/S) 416; one or more database management systems (DBMS) 418 configured to access the memory 406 and/or one or more external datastores 424; and one or more program modules, applications, engines, managers, computer-executable code, scripts, or the like such as, for example, one or more weakly-supervised GAIN training modules 420 and one or more partially-supervised GAIN training modules 422. Any of the components depicted as being stored in data storage 414 may include any combination of software, firmware, and/or hardware. The software and/or firmware may include computer-executable instructions (e.g., computer-executable program code) that may be loaded into the memory 406 for execution by one or more of the processor(s) 404 to perform any of the operations described earlier. More specifically, computer-executable instructions of the weakly-supervised GAIN training module(s) 420 may be executed to implement the example method 200. Similarly, computer-executable instructions of the partially-supervised GAIN training module(s) 422 may be executed to implement the example method 300.

Although not depicted in FIG. 4, the data storage 414 may further store various types of data utilized by components of the GAIN server 402 (e.g., data stored in the datastore(s) 424). Any data stored in the data storage 414 may be loaded into the memory 406 for use by the processor(s) 404 in executing computer-executable instructions. In addition, any data stored in the data storage 414 may potentially be stored in the external datastore(s) 424 and may be accessed via the DBMS 418 and loaded in the memory 406 for use by the processor(s) 404 in executing computer-executable instructions.

The processor(s) 404 may be configured to access the memory 406 and execute computer-executable instructions loaded therein. For example, the processor(s) 404 may be configured to execute computer-executable instructions of the various program modules, applications, engines, managers, or the like of the GAIN server 402 to cause or facilitate various operations to be performed in accordance with one or more embodiments of the disclosure. The processor(s) 404 may include any suitable processing unit capable of accepting data as input, processing the input data in accordance with stored computer-executable instructions, and generating output data. The processor(s) 404 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 404 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 404 may be capable of supporting any of a variety of instruction sets.

Referring now to other illustrative components depicted as being stored in the data storage 414, the O/S 416 may be loaded from the data storage 414 into the memory 406 and may provide an interface between other application software executing on the GAIN server 402 and hardware resources of the GAIN server 402. More specifically, the O/S 416 may include a set of computer-executable instructions for managing hardware resources of the GAIN server 402 and for providing common services to other application programs. In certain example embodiments, the O/S 416 may include or otherwise control the execution of one or more of the program modules, engines, managers, or the like depicted as being stored in the data storage 414. The O/S 416 may include any operating system now known or which may be developed in the future including, but not limited to, any server operating system, any mainframe operating system, or any other proprietary or non-proprietary operating system.

The DBMS 418 may be loaded into the memory 406 and may support functionality for accessing, retrieving, storing, and/or manipulating data stored in the memory 406, data stored in the data storage 414, and/or data stored in external datastore(s) 424. The DBMS 418 may use any of a variety of database models (e.g., relational model, object model, etc.) and may support any of a variety of query languages. The DBMS 418 may access data represented in one or more data schemas and stored in any suitable data repository. As such, data stored in the datastore(s) 424 may include, for example, attention maps 426, loss functions 428, and input images 430. External datastore(s) 424 that may be accessible by the GAIN server 402 via the DBMS 418 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the GAIN server 402, the input/output (I/O) interface(s) 408 may facilitate the receipt of input information by the GAIN server 402 from one or more I/O devices as well as the output of information from the GAIN server 402 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the GAIN server 402 or may be separate. The I/O devices may further include, for example, any number of peripheral devices such as data storage devices, printing devices, and so forth.

The I/O interface(s) 408 may also include an interface for an external peripheral device connection such as universal serial bus (USB), FireWire, Thunderbolt, Ethernet port or other connection protocol that may connect to one or more networks. The I/O interface(s) 408 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The GAIN server 402 may further include one or more network interfaces 410 via which the GAIN server 402 may communicate with one or more other devices or systems via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules/engines depicted in FIG. 4 as being stored in the data storage 414 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the GAIN server 402 and/or other computing devices accessible via one or more networks, may be provided to support functionality provided by the modules depicted in FIG. 4 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 4 may be implemented, at least partially, in hardware and/or firmware across any number of devices.

It should further be appreciated that the GAIN server 402 may include alternate and/or additional hardware, software, or firmware components beyond those described or depicted without departing from the scope of the disclosure. More particularly, it should be appreciated that software, firmware, or hardware components depicted as forming part of the GAIN server 402 are merely illustrative and that some components may not be present or additional components may be provided in various embodiments. While various illustrative modules have been depicted and described as software modules stored in data storage 414, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 200 and/or the method 300 may be performed by a GAIN server 402 having the illustrative configuration depicted in FIG. 4, or more specifically, by one or more program modules, engines, applications, or the like executable on such a device. It should be appreciated, however, that such operations may be implemented in connection with numerous other device configurations.

The operations described and depicted in the illustrative method of FIGS. 2A-2B and/or the illustrative method of FIG. 3 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 2A-2B or FIG. 3 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
   providing an input image to a convolutional neural network (CNN), wherein the input image is associated with an image-level label;
   obtaining, from the CNN, a first classification probability distribution associated with the input image;
   determining, based at least in part on the first classification probability distribution and the image-level label of the input image, a classification loss;
   determining an attention map associated with the input image;
   applying a thresholding operation to the attention map to obtain a soft mask;
   applying the soft mask to the input image to obtain a masked image;
   providing the masked image as an input to the CNN;
   obtaining, from the CNN, a second classification probability distribution associated with the masked image;
   determining an attention mining loss associated with the attention map based at least in part on the first classification probability distribution and the second classification probability distribution; and
   utilizing the classification loss and the attention mining loss to self-guide training of the CNN.

2. The computer-implemented method of claim 1, wherein the input image is a first input image and the attention map is a first attention map, the method further comprising:
   providing a second input image to the CNN, wherein the second input image is associated with a pixel-level label;
   determining a second attention map associated with the second input image;
   determining an attention loss associated with the second attention map based at least in part on the pixel-level label of the second input image; and
   utilizing the attention loss in addition to the classification loss and the attention mining loss to provide extra supervision during the training of the CNN.

3. The computer-implemented method of claim 2, wherein determining the attention loss associated with the second attention map comprises determining an L2 norm Euclidean distance between the pixel-level label of the second input image and the second attention map.

4. The computer-implemented method of claim 1, wherein the input image is a first input image and the attention map is a first attention map, the method further comprising testing the trained CNN by:

providing a second input image to the trained CNN; and outputting, by the trained CNN, a third classification probability distribution and a second attention map corresponding to a target class of the second input image.

5. The computer-implemented method of claim 1, wherein applying the thresholding operation to the attention map to obtain the soft mask comprises executing a masking function on the attention map to determine one or more portions of the attention map that have a classification response to a target class of the input image that is above a threshold value.

6. The computer-implemented method of claim 5, wherein applying the soft mask to the input image to obtain the masked image comprises performing an element-wise multiplication of the soft mask and the input image to obtain the masked image, wherein the masked image has one or more regions of the input image removed therefrom that correspond to the one or more portions of the attention map that have the classification response that is above the threshold value.

7. The computer-implemented method of claim 1, wherein determining the attention map associated with the input image comprises:

backpropagating the classification loss to a last convolutional layer of the CNN;

passing the backpropagated classification loss through a global average pooling layer to obtain a set of weights; and applying the set of weights to one or more feature maps to obtain the attention map.

8. A system, comprising:

at least one memory storing computer-executable instructions; and at least one processor, wherein the at least one processor is configured to access the at least one memory and execute the computer-executable instructions to:

provide an input image to a convolutional neural network (CNN), wherein the input image is associated with an image-level label;

obtain, from the CNN, a first classification probability distribution associated with the input image;

determine, based at least in part on the first classification probability distribution and the image-level label of the input image, a classification loss;

determine an attention map associated with the input image;

apply a thresholding operation to the attention map to obtain a soft mask;

apply the soft mask to the input image to obtain a masked image;

provide the masked image as an input to the CNN;

obtain, from the CNN, a second classification probability distribution associated with the masked image;

determine an attention mining loss associated with the attention map based at least in part on the first classification probability distribution and the second classification probability distribution; and utilize the classification loss and the attention mining loss to self-guide training of the CNN.

9. The system of claim 8, wherein the input image is a first input image and the attention map is a first attention map, and wherein the at least one processor is further configured to execute the computer-executable instructions to:

provide a second input image to the CNN, wherein the second input image is associated with a pixel-level label;

determine a second attention map associated with the second input image;

determine an attention loss associated with the second attention map based at least in part on the pixel-level label of the second input image; and utilize the attention loss in addition to the classification loss and the attention mining loss to provide extra supervision during the training of the CNN.

10. The system of claim 9, wherein the at least one processor is configured to determine the attention loss associated with the second attention map by executing the computer-executable instructions to determine an L2 norm Euclidean distance between the pixel-level label of the second input image and the second attention map.

11. The system of claim 8, wherein the input image is a first input image and the attention map is a first attention map, and wherein the at least one processor is further configured to execute the computer-executable instructions for training the CNN including to:

provide a second input image to the trained CNN; and output, by the trained CNN, a third classification probability distribution and a second attention map corresponding to a target class of the second input image.

12. The system of claim 8, wherein the at least one processor is configured to apply the thresholding operation to the attention map to obtain the soft mask by executing the computer-executable instructions to execute a masking function on the attention map to determine one or more portions of the attention map that have a classification response to a target class of the input image that is above a threshold value.

13. The system of claim 12, wherein the at least one processor is configured to apply the soft mask to the input image to obtain the masked image by executing the computer-executable instructions to perform an element-wise multiplication of the soft mask and the input image to obtain the masked image, wherein the masked image has one or more regions of the input image removed therefrom that correspond to the one or more portions of the attention map that have the classification response that is above the threshold value.

14. The system of claim 8, wherein the at least one processor is configured to determine the attention map associated with the input image by executing the computer-executable instructions to:

backpropagate the classification loss to a last convolutional layer of the CNN;

pass the backpropagated classification loss through a global average pooling layer to obtain a set of weights; and apply the set of weights to one or more feature maps to obtain the attention map.

15. A computer program product comprising a non-transitory storage medium readable by a processing circuit, the storage medium storing instructions executable by the processing circuit to cause a method to be performed, the method comprising:

providing an input image to a convolutional neural network (CNN), wherein the input image is associated with an image-level label;

obtaining, from the CNN, a first classification probability distribution associated with the input image;

determining, based at least in part on the first classification probability distribution and the image-level label of the input image, a classification loss;

determining an attention map associated with the input image;

applying a thresholding operation to the attention map to obtain a soft mask;

applying the soft mask to the input image to obtain a masked image;

providing the masked image as an input to the CNN;

obtaining, from the CNN, a second classification probability distribution associated with the masked image;

determining an attention mining loss associated with the attention map based at least in part on the first classification probability distribution and the second classification probability distribution; and utilizing the classification loss and the attention mining loss to self-guide training of the CNN.

16. The computer program product of claim 15, wherein the input image is a first input image and the attention map is a first attention map, the method further comprising:

providing a second input image to the CNN, wherein the second input image is associated with a pixel-level label;

determining a second attention map associated with the second input image;

determining an attention loss associated with the second attention map based at least in part on the pixel-level label of the second input image; and utilizing the attention loss in addition to the classification loss and the attention mining loss to provide extra supervision during the training of the CNN.

17. The computer program product of claim 16, wherein determining the attention loss associated with the second attention map comprises determining an L2 norm Euclidean distance between the pixel-level label of the second input image and the second attention map.

18. The computer program product of claim 15, wherein the input image is a first input image and the attention map is a first attention map, the method further comprising testing the trained CNN by:

providing a second input image to the trained CNN; and outputting, by the trained CNN, a third classification probability distribution and a second attention map corresponding to a target class of the second input image.

19. The computer program product of claim 15, wherein applying the thresholding operation to the attention map to obtain the soft mask comprises:

executing a masking function on the attention map to determine one or more portions of the attention map that have a classification response to a target class of the input image that is above a threshold value, and wherein applying the soft mask to the input image to obtain the masked image comprises:

performing an element-wise multiplication of the soft mask and the input image to obtain the masked image, wherein the masked image has one or more regions of the input image removed therefrom that correspond to the one or more portions of the attention map that have the classification response that is above the threshold value.

20. The computer program product of claim 15, wherein determining the attention map associated with the input image comprises:

backpropagating the classification loss to a last convolutional layer of the CNN;

passing the backpropagated classification loss through a global average pooling layer to obtain a set of weights; and applying the set of weights to one or more feature maps to obtain the attention map.

* * * * *